US009163317B2

(12) United States Patent
Morin et al.

(10) Patent No.: US 9,163,317 B2
(45) Date of Patent: Oct. 20, 2015

(54) DIFFUSION LAYER FOR AN ELECTROCHEMICAL DEVICE AND METHOD FOR PRODUCING SUCH A DIFFUSION LAYER

(75) Inventors: Arnaud Morin, Grenoble (FR); Jean-Marc Beraud, Rives (FR); Jenny Jonquille, Grenoble (FR); Joel Pauchet, Saint Martin D'Uriage (FR); Jean-Marc Senecot, Morestel (FR)

(73) Assignees: Commissariat a l'energie atomique et aux energies alternatives, Paris (FR); HEXCEL REINFORCEMENTS, Dagneux (FR)

( * ) Notice: Subject to any disclaimer, the term of this patent is extended or adjusted under 35 U.S.C. 154(b) by 0 days.

(21) Appl. No.: 13/641,956
(22) PCT Filed: Apr. 20, 2011
(86) PCT No.: PCT/EP2011/056362
§ 371 (c)(1),
(2), (4) Date: Nov. 29, 2012
(87) PCT Pub. No.: WO2011/131737
PCT Pub. Date: Oct. 27, 2011

(65) Prior Publication Data
US 2013/0061459 A1 Mar. 14, 2013

(30) Foreign Application Priority Data
Apr. 20, 2010 (FR) ...................................... 10 53009

(51) Int. Cl.
*H01M 4/82* (2006.01)
*C25B 9/10* (2006.01)
(Continued)

(52) U.S. Cl.
CPC ................ *C25B 9/10* (2013.01); *H01M 8/0234* (2013.01); *H01M 2008/1095* (2013.01); *Y02E 60/50* (2013.01); *Y10T 29/49108* (2015.01)

(58) Field of Classification Search
None
See application file for complete search history.

(56) References Cited

U.S. PATENT DOCUMENTS 4,076,885 A * 2/1978 Brossel et al. ................... 442/86
5,707,755 A * 1/1998 Grot ............................... 429/490
(Continued)

FOREIGN PATENT DOCUMENTS

EP 0 286 945 A2 10/1988
FR 2 788 168 A1 7/2000
(Continued)

OTHER PUBLICATIONS

Adachi et al., JP 2005-203314, Gaseous diffusion layer for fuel cell used in electric vehicle, has secondary low rigidity fiber bundle arranged at right angles to highly rigid primary fiber bundles, Jul. 28, 2005.*

(Continued)

*Primary Examiner* — Patrick Ryan
*Assistant Examiner* — Jose Colucci Rios
(74) *Attorney, Agent, or Firm* — Oblon, McClelland, Maier & Neustadt, L.L.P.

(57) ABSTRACT

A method for producing a diffusion layer of an electrochemical device, including: superimposition of multiple unidirectional webs of carbon filaments, filaments of each web positioned parallel with, and next to, one another; needle punching of the webs, breaking a proportion of the filaments such that broken portions of the filaments are tangled with other filaments of the webs; and cutting a proportion of the multiple unidirectional webs, the carbon filaments forming one electrically conducting outer surface of the diffusion layer. The needle punching is accomplished all the way through the multiple unidirectional webs, and/or through two principal opposite faces of the multiple unidirectional webs, and/or with an impact density against the multiple unidirectional webs of between approximately 100 and 300 impacts/cm².

16 Claims, 5 Drawing Sheets

(51) Int. Cl.
*H01M 8/02* (2006.01)
*H01M 8/10* (2006.01)

(56) References Cited

U.S. PATENT DOCUMENTS

| | | |
|---|---|---|
| 6,444,347 B1* | 9/2002 | Ouvry et al. ............. 429/480 |
| 6,489,051 B1 | 12/2002 | Inoue |
| 7,144,476 B2 | 12/2006 | Wilde et al. |
| 2002/0031706 A1* | 3/2002 | Dasgupta et al. ............. 429/212 |
| 2002/0094472 A1* | 7/2002 | Xie ............. 429/44 |
| 2003/0100239 A1* | 5/2003 | Gaffney et al. ............. 442/354 |
| 2003/0109189 A1 | 6/2003 | Jorder et al. |
| 2003/0194557 A1 | 10/2003 | Wilde et al. |
| 2003/0219646 A1* | 11/2003 | LeCostaouec ............. 429/44 |
| 2004/0097149 A1* | 5/2004 | Crawford et al. ............. 442/218 |
| 2006/0159982 A1* | 7/2006 | Yoshitake et al. ............. 429/44 |
| 2008/0093006 A1 | 4/2008 | Dillard et al. |
| 2010/0040926 A1* | 2/2010 | Blanchet et al. ............. 429/30 |
| 2010/0279177 A1 | 11/2010 | Yang |
| 2013/0144542 A1 | 6/2013 | Ernst et al. |

FOREIGN PATENT DOCUMENTS

| | | |
|---|---|---|
| JP | 5-135774 A | 6/1993 |
| JP | 2003-183962 | 7/2003 |
| JP | 2005-116315 | 4/2005 |
| JP | 2005-243423 A | 9/2005 |
| JP | 2008-027672 | 2/2008 |
| WO | WO 98/44183 A1 | 10/1998 |

OTHER PUBLICATIONS

French Preliminary Search Report issued Nov. 9, 2010 in Patent Application No. 1053009 with English translation of categories of cited documents.
International Search Report issued Sep. 9, 2011 in PCT/EP2011/056362.
Japanese Office Action dated Feb. 16, 2015 in corresponding Japanese application No. 2013-505482, with English translation.

* cited by examiner

DIFFUSION LAYER FOR AN ELECTROCHEMICAL DEVICE AND METHOD FOR PRODUCING SUCH A DIFFUSION LAYER

TECHNICAL FIELD

The invention concerns the field of electrochemical systems, or devices, including diffusion layers made of an electrically conducting material such as carbon. The invention notably concerns the field of fuel cells and PEM-type (Proton Exchange Membrane) electrolysers, Phosphoric Acid Fuel Cells (PAFC), batteries, etc.

STATE OF THE PRIOR ART

Figure 1:
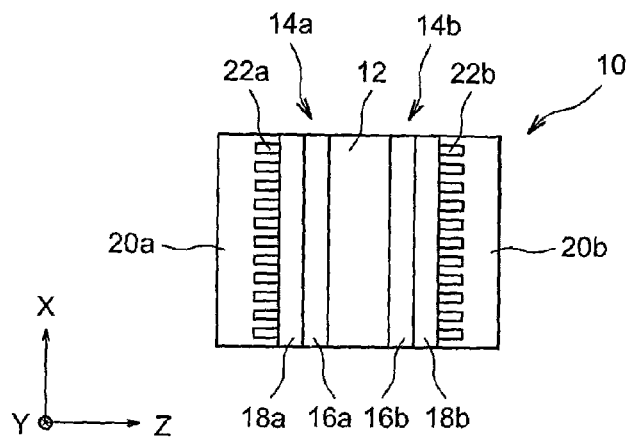

An electrochemical cell 10 of a PEMFC-type (Polymer Electrolyte Membrane Fuel Cell) is represented diagrammatically in FIG. 1. This cell 10 includes a membrane-electrode assembly (AME) including a membrane 12, which forms an electrolyte, comprising a polymer, and positioned between two electrodes: an anode 14a and a cathode 14b. Anode 14a and cathode 14b each includes an active layer 16a, 16b and a diffusion layer 18a, 18b.

Production of such an AME notably includes a step of deposition of active layers 16a, 16b, through the use, for example, of coating, transfer, sputtering, screen printing, etc. It is possible either to deposit active layers 16a, 16b on diffusion layers 18a, 18b, where anode 14a and cathode 14b produced in this manner are then assembled either side of membrane 12, or to deposit active layers 16a, 16b either side of membrane 12, where diffusion layers 18a, 18b are then assembled on active layers 16a, 16b.

Two seals can also be positioned either side of the AME.

The areas of anode 14a and of cathode 14b opposite membrane 12 are not necessarily identical, but are less than or equal to the areas of membrane 12 opposite which they are positioned.

In cell 10, when it is used in a fuel cell, the AME enables the chemical energy from the reaction of the formation of water from gaseous hydrogen ($H_2$) and oxygen ($O_2$), used respectively as the fuel and oxidant of this reaction, to be converted into electrical energy. These gases are distributed respectively at anode 14a (receiving the hydrogen) and at cathode 14b (receiving the oxygen) through an anodic monopolar plate 20a and a cathodic monopolar plate 20b, between which the AME is positioned. These monopolar plates 20a, 20b are also used for collecting the electrical energy produced and for evacuating the heat produced by the reaction of conversion of chemical energy into electrical energy. In monopolar plates 20a, 20b represented in FIG. 1, the gases ($H_2$ and $O_2$) are distributed through channels 22a, 22b formed in these plates, extending in a direction parallel with axis y (length of channels 22a, 22b parallel with axis y). In a variant, monopolar plates 20a, 20b can have a porous structure, enabling the gases to be distributed in this manner without requiring channels.

Figure 2:
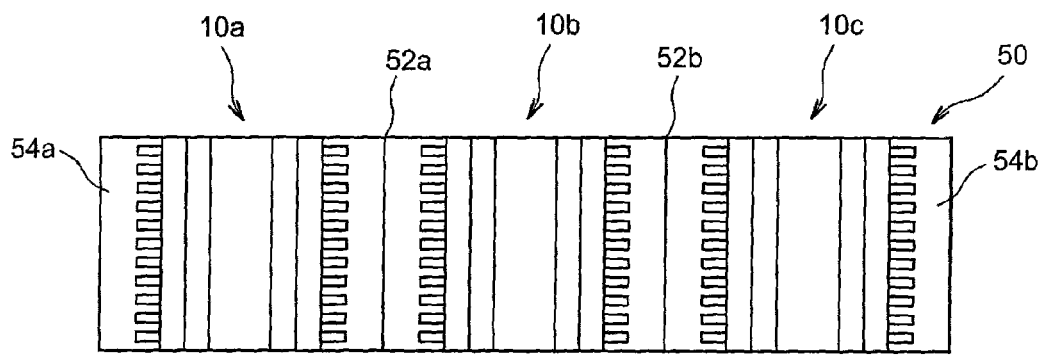

A PEM-type electrochemical device 50 is represented diagrammatically in FIG. 2. This electrochemical device is, for example, a fuel cell. This fuel cell 50 is formed by several electrochemical cells 10a, 10b, 10c, for example similar to electrochemical cell 10 which was previously described in connection with FIG. 1, positioned next to one another.

In such an electrochemical device, two adjacent monopolar plates, one used for distributing the fuel (anodic monopolar plate 18a of a first cell) and the other use for distributing the oxidant (cathodic monopolar plate 18b of a second cell adjacent to the first cell), can be formed by the same element, called a bipolar plate. Thus, in fuel cell 50 represented in FIG. 2, the AMEs of cells 10a, 10b and 10c are separated from one another by bipolar plates 52a, 52b. Each end of fuel cell 50 includes a monopolar plate 54a, 54b.

Each bipolar plate 52a, 52b can have channels in which a heat-carrying fluid flows, enabling electrochemical cells 10a, 10b, 10c of fuel cell 50 to be cooled.

Electrochemical device 50 represented in FIG. 2 can also be a PEM-type electrolyser, where such an electrolyser includes a structure comparable to a PEM fuel cell. However, the operation of such an electrolyser is the reverse operation to that of a fuel cell, since the electrical energy is converted into chemical energy, forming gaseous hydrogen and oxygen from water.

In electrochemical cells 10a-10c of fuel cell 50, each fluid distribution circuit (fuel, oxidant and, if applicable, heat-carrying fluid) has an inlet and an outlet for these fluids. And it is important to ensure that fuel cell 50 is sealed, in order to prevent any blending of the fluids with one another, and also any leakage of fluid from the inside of one of the cells to the outside of the fuel cell. Thus, sealing is a very important point to take into consideration when designing a fuel cell. This sealing is provided by seals positioned between the monopolar or bipolar plates and the AMEs, on the anodic and cathodic sides. The shapes and functions of these seals depend on the architecture of the electrochemical cells, and more generally on the architecture of the fuel cell.

Thus, in an electrochemical cell, seals are used only to prevent leakages of fuel and of oxidant outside the fuel cell, since the sealing between the anodic and cathodic compartments is provided by the polymer membrane of the AME.

In a PEM-type fuel cell, the fluids are generally conveyed to each electrochemical cell through channels traversing the entire stack of cells, and therefore through each bipolar plate. The function of the seal is then to prevent leakages of fluid from the inside to the outside of the fuel cell, and to prevent any blending of fluids.

In a PEM-type fuel cell or electrolyser, each diffusion layer consists of a diffusion support and a microporous layer.

The diffusion layers in a PEM-type fuel cell play many roles, and their characteristics must be chosen so as to achieve a compromise between several criteria.

Firstly, the diffusion layers must be good electrical conductors, and must be sufficiently porous to allow the reactive gases ($H_2$ and $O_2$) to pass in air and the produced water to be evacuated. They must also be good thermal conductors in order to efficiently evacuate the heat, and not to increase the cell's operating temperature, which could in the contrary case damage the membranes of the fuel cell. Finally, they must be sufficiently rigid to act as a mechanical reinforcement for the AMEs, due to the teeth/channels architecture of the bipolar and monopolar plates of the fuel cell.

Management of the water in the fuel cell is an essential point for the AMEs, and therefore the fuel cell, to have satisfactory operation and optimal reliability. This water management, which is mostly accomplished by the diffusion layers, is complex since, in each AME:

water must be conveyed in the gaseous state as far as the anodic and cathodic active layers, and as far as the membrane;

at least a proportion of the water produced at the cathode must be returned to the anodic side. This flow must at least partially compensate for the migration of the water under the effect of proton conduction from the anode to the cathode;

any excess water, on both the anodic and cathodic sides, must be evacuated as far as the bipolar plates, in order not to block the gases' access to the active layers, which could lead to poor operation of the cell.

Within the AME there is therefore a complex equilibrium of the water flows depending on the operating conditions, the components of the AME, and notably of the diffusion layers, and on the architecture of the bipolar plates.

In addition, the diffusion layer must be stable (chemically and physically) under the operating conditions of the fuel cell. The criteria influencing the stability of the materials are temperature, which may attain approximately 120° C., relative humidity (HR), which may be 100%, pH, which may be equal to approximately 1, the activity of the gases ($H_2$ and $O_2$, the pressures of which may reach approximately 4 bar), and a difference of electrical potentials, which may be 1.2 V between the anode and the cathode.

These constraints are also found in the case of PEM-type electrolysers with, in this case, a difference of electrical potentials which may be between 1.2 V and 2.5 V, between the anode and the cathode.

The diffusion support of a diffusion layer generally takes the form of a fabric (woven diffusion support), or paper or felt (non-woven diffusion supports) made of carbon fibres, manufactured by the dry or wet method.

Carbon papers are obtained from a suspension of broken carbon fibres of lengths of between approximately 3 mm and 70 mm, and dispersed in a solvent with a polymer binder. The suspension is then filtered, or the solvents are evaporated, in order to obtain a self-supporting material which is thermally treated to carbonise the polymer binder. Other steps of impregnation, moulding and thermal treatment can be implemented, as described in documents EP 0 286 945 B1 and U.S. Pat No. 6,489,051 B1.

Due to the manufacturing method used, these papers are available only in the form of sheets, which does not make these diffusion supports easy to transport. In addition, the large number of manufacturing steps and the thermal treatments of carbonisation or graphitisation of the materials used continuously greatly increase the cost of a carbon paper diffusion layer.

Carbon paper is more rigid and has a more uniform structure than fabric. However, it is brittle and more difficult to handle than fabric.

As with fabric, carbon papers have an anisotropy, bearing in mind that the carbon fibres are aligned in random fashion in the paper. In addition, given that the fibres are distributed randomly, the structure of the diffusion support is not controlled, resulting in poor reproducibility of the characteristics of the diffusion supports produced in this manner.

Carbon felts are obtained by carbonisation of a precursor polymer felt produced by entangling polymer fibres. A continuous carbonisation or graphitisation thermal treatment is also implemented. Felts are less expensive to produce than carbon papers and fabrics, and have a more isotropic structure. However, they are still expensive. In addition, the tangling of the carbon fibres is accomplished randomly by pressurised fluid jets, resulting in poor reproducibility of the characteristics of the diffusion supports produced in this manner.

Document FR 2 788 168 mentions the use of unidirectional webs of carbon filaments attached to one another by needle punching to produce a diffusion layer of an electrochemical catalyst.

DESCRIPTION OF THE INVENTION

One aim of the present invention is to propose a new method for producing a diffusion layer of an electrochemical device such as a fuel cell or a PEM-type electrolyser, using several unidirectional webs, or ribbons, or bundles, or warps, of carbon filaments, not having the disadvantages of diffusion layers of the prior art, and improving performance (increased electrical conductivity, reduced electrical contact resistances, etc.) of an electrochemical device including such a diffusion layer.

To this end, the present invention proposes a method of production of a diffusion layer of an electrochemical device, including at least the following steps:

superimposition of multiple unidirectional webs of carbon filaments, where the carbon filaments of each unidirectional web are positioned next to one another, and aligned roughly parallel with one another, needle punching of the unidirectional webs, breaking a proportion of the carbon filaments such that broken portions of the said carbon filaments are tangled with the other carbon filaments of the unidirectional webs, cutting of at least a proportion of the multiple unidirectional webs, where the carbon filaments form at least one electrically conducting outer surface of the diffusion layer, and in which the step of needle punching is accomplished all the way through the multiple unidirectional webs, and/or through two principal opposite faces of the multiple unidirectional webs, and/or with an impact density against the multiple unidirectional webs of between approximately 100 and 300 impacts/$cm^2$.

In the course of such a method, needle punching is accomplished, the controlled settings of which enable the performance of the electrochemical device using the diffusion layer produced with this method to be improved.

An alignment of the carbon filaments of at least a first of the said unidirectional webs may form a non-zero angle relative to an alignment of the carbon filaments of at least a second of the said unidirectional webs.

Prior to the superimposition of the unidirectional webs, the carbon filaments may be coated with a material capable of strengthening the mechanical properties of the carbon filaments, and then be attached to one another, forming the different unidirectional webs, where the said strengthening material is eliminated after the carbon filaments are attached to one another.

The method may also include a step of treatment of the carbon filaments giving the carbon filaments a hydrophobic or hydrophilic character.

Each of the unidirectional webs may be between approximately 10 µm and 200 µm thick and/or have a mass per unit area of between approximately 40 g/$m^2$ and 60 g/$m^2$.

The diameter of each carbon filament may be between approximately 6 µm and 8 µm and/or each carbon filament may have an electrical resistivity of between approximately 0.8 $\Omega$.cm and 1.8 $\Omega$.cm.

An alignment of the carbon filaments of at least a first of the said unidirectional webs may form a non-zero angle or an angle of between approximately 10° and 95°, or between approximately 40° and 50°, relative to an alignment of the carbon filaments of at least a second of the said unidirectional webs of carbon filaments.

The diffusion layer may include a number of superimposed unidirectional webs of carbon filaments greater than or equal to two and less than or equal to five.

The diffusion layer may include a first and second unidirectional webs of carbon filaments such that the alignment of the carbon filaments of the first unidirectional web forms an angle of between approximately 0° and 20° relative to the alignment of the carbon filaments of the second unidirectional web, and may also include a third unidirectional web of carbon filaments positioned between the first and second unidirectional webs of carbon filaments, such that each of the alignments of the carbon filaments of the first and second unidirectional webs forms an angle of between approximately 70° and 110° relative to the alignment of the carbon filaments of the third unidirectional web.

The diffusion layer may also include a fourth unidirectional web of carbon filaments positioned between the first and second unidirectional web of carbon filaments, such that the alignment of the carbon filaments of the fourth unidirectional web forms an angle of between 70° and 110° relative to each of the alignments of the carbon filaments of the first and second unidirectional webs.

In a variant, the diffusion layer may include four unidirectional webs of carbon filaments, where the webs are superimposed such that the alignments of the carbon filaments of each of the said four unidirectional webs form an angle of between approximately 25° and 65° relative to the alignment or alignments of the carbon filaments of the unidirectional webs adjacent to the said unidirectional web.

The invention also concerns a method for producing an electrochemical cell with a proton exchange membrane, including at least the implementation of a method for producing a diffusion layer as described above.

The alignment of the carbon filaments of at least one of the unidirectional webs of the diffusion layer may be roughly perpendicular to a direction of a length of at least one channel of a monopolar plate positioned opposite the diffusion layer.

The invention also concerns a method for producing a fuel cell with a proton exchange membrane, including at least the implementation of a method for producing an electrochemical cell as described above.

The invention also concerns a method for producing an electrolyser with a proton exchange membrane, including at least the implementation of a method for producing an electrochemical cell as described above.

A diffusion layer of an electrochemical device including at least a portion of a unidirectional web of attached carbon filaments, for example attached to one another, aligned roughly parallel with one another, forming at least one electrically conducting outer surface of the diffusion layer, is described.

Unlike diffusion layers including a diffusion support made of carbon paper or carbon felt, which use non-continuous carbon fibres of between approximately 3 mm and 70 mm in length, and dispersed randomly, such a diffusion layer is produced from at least one unidirectional layer of carbon filaments aligned parallel with one another.

Such a diffusion layer is less expensive to produce, bearing in mind the lower cost of production of a unidirectional web of carbon filaments compared to carbon paper or carbon felt, notably due to the smaller number of steps which must be implemented to produce such a web, compared to the production of carbon papers or carbon felts. In addition, unlike carbon papers or carbon felts, such a diffusion layer requires no thermal treatment implemented continuously for its production, bearing in mind the use of carbon filaments, which do not require any carbonisation or graphitisation treatment, enabling their manufacturing costs to be reduced appreciably.

Compared to carbon paper, such a unidirectional web of carbon filaments is also easy to handle and easy to transport, for example in the form of rolls, which is an advantage when producing the diffusion layer.

In addition, the regular distribution and alignment of the carbon filaments in the diffusion layer enables satisfactory reproducibility of the structure of the diffusion layer to be obtained, and therefore of the characteristics of the diffusion layer, unlike carbon papers and carbon felts.

Such a diffusion layer also meets all the criteria of the requirements of PEM-type fuel cells and electrolysers: satisfactory porosity, to allow reagents to pass through and products to be evacuated; thin, enabling the electrical resistivity of the diffusion layer to be reduced; satisfactory adaptability of the diffusion layer to variations of relative humidity in a fuel cell.

Compared to the diffusion layers of the prior art, the structure of such a diffusion layer is better controlled, notably in terms of thickness and porosity, due to the regularity of the alignment of the carbon filaments.

The unidirectional web of carbon filaments may be between approximately 10 μm and 200 μm thick and/or have a mass per unit area of between approximately 40 g/m$^2$ and 60 g/m$^2$. Such a thickness gives the diffusion layer a low electrical resistance. The thickness of the diffusion layer may be advantageously chosen to be as small as possible.

The diameter of each carbon filament may be between approximately 6 μm and 8 μm and/or each carbon filament may have an electrical resistivity of between approximately 0.8 Ω.cm and 1.8 Ω.cm.

To obtain the carbon filaments it is possible to use carbon filaments each of which contains, for example, between approximately 1,000 and 320,000 carbon filaments, and advantageously between approximately 12,000 and 48,000 carbon filaments. By using carbon filaments taken from wires including a large number of carbon filaments, the cost of production of the diffusion layer is reduced further, bearing in mind that such wires are less expensive to produce than wires having a smaller number of carbon filaments.

The diffusion layer may include multiple superimposed unidirectional webs of carbon filaments, where the carbon filaments of each unidirectional web may be aligned roughly parallel with one another, and such that an alignment of the carbon filaments of at least a first of the said unidirectional webs forms a non-zero angle, or angle of between approximately 10° and 95°, or advantageously of between approximately 40° and 50°, relative to an alignment of the carbon filaments of at least a second of the said unidirectional webs of carbon filaments. Such an alignment of the unidirectional webs with one another enables a diffusion layer to be formed having excellent porosity for gas to pass through and water to be evacuated when the diffusion layer is used in a fuel cell, or water to pass through and gases to be evacuated when the diffusion layer is used in an electrolyser.

The diffusion layer may include a number of superimposed unidirectional webs of carbon filaments greater than or equal to two and less than or equal to five.

The diffusion layer may include a first and second unidirectional webs of carbon filaments such that the alignment of the carbon filaments of the first unidirectional web forms an angle of between approximately 0° and 20° relative to the alignment of the carbon filaments of the second unidirectional web, and may also include a third unidirectional web of carbon filaments positioned between the first and second unidirectional webs of carbon filaments, such that each of the alignments of the carbon filaments of the first and second unidirectional webs forms an angle of between approximately 70° and 110° relative to the alignment of the carbon filaments of the third unidirectional web.

The diffusion layer may also include a fourth unidirectional web of carbon filaments positioned between the first and second unidirectional web of carbon filaments, such that the alignment of the carbon filaments of the fourth unidirectional web forms an angle of between 70° and 110° relative to each of the alignments of the carbon filaments of the first and second unidirectional webs.

In a variant, the diffusion layer may include four unidirectional webs of carbon filaments, where the webs are superimposed such that the alignments of the carbon filaments of each of the said four unidirectional webs form an angle of between approximately 25° and 65° relative to the alignment or alignments of the carbon filaments of the unidirectional webs adjacent to the said unidirectional web.

A proportion of the carbon filaments may be broken, such that broken portions of the said carbon filaments are tangled with the other carbon filaments of the unidirectional webs, thereby causing the unidirectional webs to be held together mechanically. This configuration may be the result of a needle-punch operation accomplished in the unidirectional webs of carbon filaments, an operation which notably enables the superimposed unidirectional webs of carbon filaments to be better held together mechanically, in order to be able to handle them more easily, without destroying the structure formed by the superimposition of the unidirectional webs, i.e. without modifying the angles formed between the alignments of the carbon filaments of the different webs.

The diffusion layer may have a surface energy with a hydrophobic character, for example when the diffusion layer is intended to be used in a fuel cell, or with a hydrophilic character, for example when the diffusion layer is intended to be used in an electrolyser. Such a hydrophobic character can, for example, be obtained by treating the unidirectional web or webs of carbon filaments with polytetrafluoroethylene. Such a hydrophilic character can be obtained by treating the unidirectional web or webs of carbon filaments with an epoxy resin.

The diffusion layer may include two electrically conducting principal faces.

An electrochemical cell with a proton exchange membrane, including at least one diffusion layer as described above, is also described.

The alignment of the carbon filaments of at least one of the unidirectional webs of carbon filaments of the diffusion layer may be roughly perpendicular to a direction of a length of at least one channel of a monopolar plate positioned opposite the diffusion layer.

A fuel cell with a proton exchange membrane, including at least one diffusion layer as described above, is also described.

A fuel cell with a proton exchange membrane, including at least one electrochemical cell as described above, is also described.

An electrolyser with a proton exchange membrane, including at least one diffusion layer as described above, is also described.

An electrolyser with a proton exchange membrane, including at least one electrochemical cell as described above, is also described.

A use of at least a portion of a unidirectional web of attached carbon filaments, for example attached to one another, aligned roughly parallel with one another, forming a diffusion layer of an electrochemical device, where the said portion of a unidirectional web of carbon filaments forms at least one electrically conducting outer surface of the diffusion layer, is also proposed.

A method of production of a diffusion layer of an electrochemical device is also described, including at least the following steps:
arrangement of carbon filaments next to one another, and aligned roughly parallel with one another,
attachment of the carbon filaments, for example to one another, forming a unidirectional web of carbon filaments,
cutting of at least a portion of the unidirectional web,
where the carbon filaments form at least one electrically conducting outer surface of the diffusion layer.

The method may also include, between the steps of attachment and cutting, a step of superimposition of multiple unidirectional webs of carbon filaments, where the carbon filaments of each unidirectional web are aligned roughly parallel with one another, and such that an alignment of the carbon filaments of at least a first of the said unidirectional webs forms a non-zero angle or angle of between approximately 10° and 95° or between approximately 40° and 50° relative to an alignment of the carbon filaments of at least a second of the said unidirectional webs of carbon filaments, where the cutting step may include the cutting of at least a proportion of the multiple unidirectional webs.

All the carbon filaments of the different superimposed unidirectional webs, intended to form the diffusion layer, may therefore be cut through the implementation of a single cutting step. This single cutting step thus enables the cost of production of the diffusion layer to be reduced.

The method may also include, between the steps of attachment and cutting, and when the method includes a step of superimposition of at least three unidirectional webs of carbon filaments, implementation of needle punching of the unidirectional webs of carbon filaments, breaking a proportion of the carbon filaments such that broken portions of the said carbon filaments are tangled with the other carbon filaments of the unidirectional webs, causing the unidirectional webs to be held together mechanically. In a variant, this mechanical support may be obtained by passing the unidirectional webs of carbon filaments under pressurised water jets, breaking a proportion of the carbon filaments such that broken portions of the said carbon filaments are tangled with the other carbon filaments of the unidirectional webs.

Prior to the implementation of the step of positioning of the carbon filaments next to one another, the carbon filaments may be coated with a material, for example a resin and/or a hardening agent, able to strengthen the mechanical properties of the carbon filaments, and the method may also include, after the step of attachment, a step of elimination of the said material. Indeed, carbon filaments, for example those obtained from precursors made of polyacrilonitrile (PAN), may be fragile. In order to be able to handle them more easily when manufacturing unidirectional webs, the carbon filaments may therefore be subjected to a treatment called sizing, which consists in coating them with a material which strengthens the mechanical properties of the carbon filaments, for example epoxy resin. This material can then be eliminated after the carbon filaments are attached to one another, and for example before the unidirectional web or webs of carbon filaments are cut.

The method may also include, after the step of attachment, a step of treatment of the carbon filaments giving the carbon filaments a hydrophobic or hydrophilic character. Such a hydrophobic character may be obtained by treating the carbon filaments with polytetrafluoroethylene, for example by immersing them in a solution of such a material. A hydrophilic character may be obtained by treating the carbon filaments with an epoxy resin.

BRIEF DESCRIPTION OF THE ILLUSTRATIONS

Figure 3A:
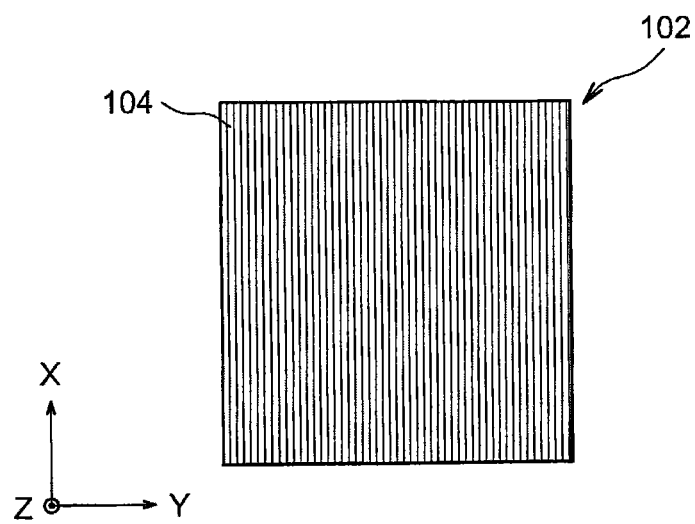
Figure 3B:
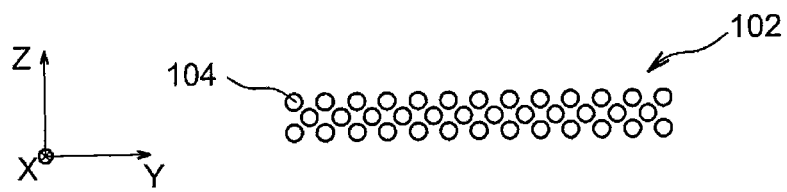
Figure 4:
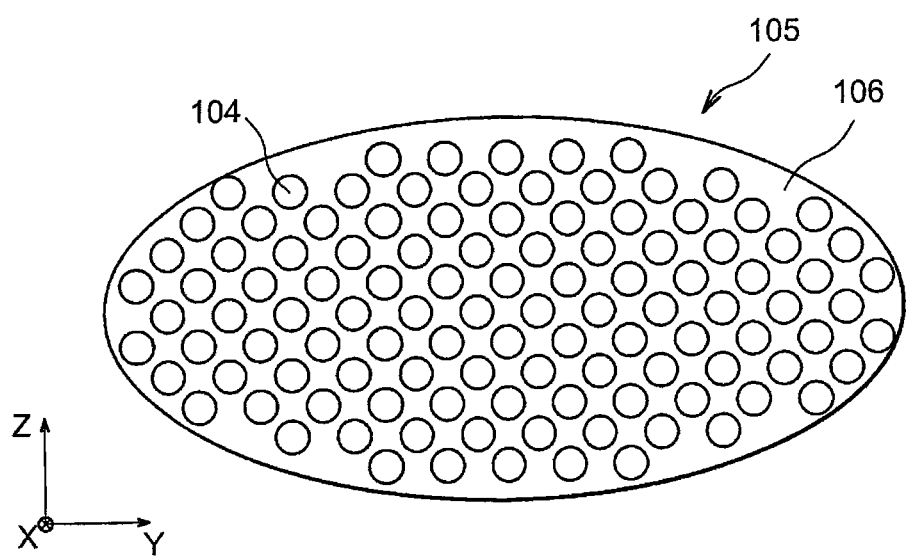
Figure 5:
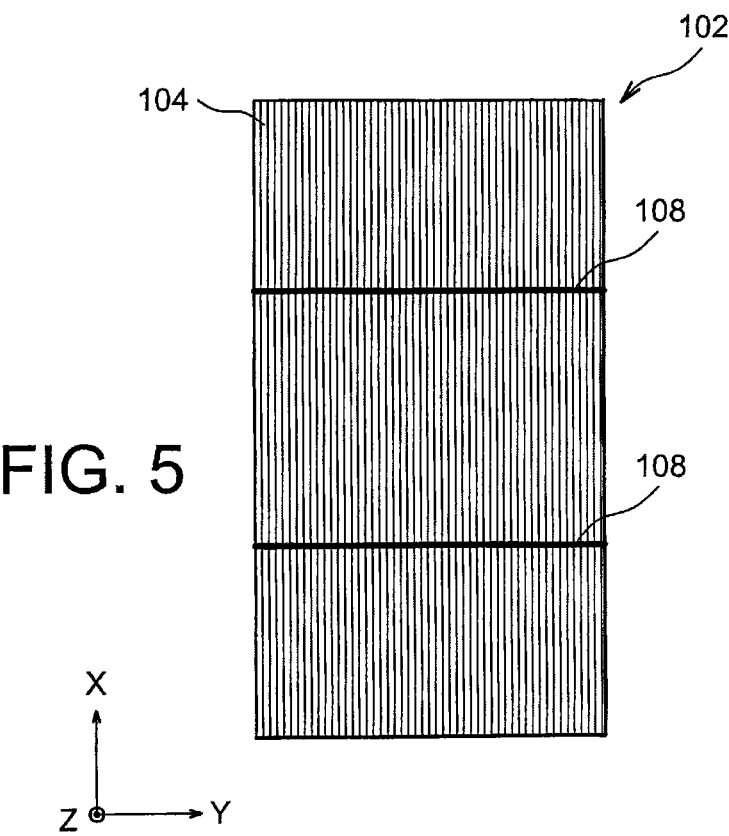
Figure 6:
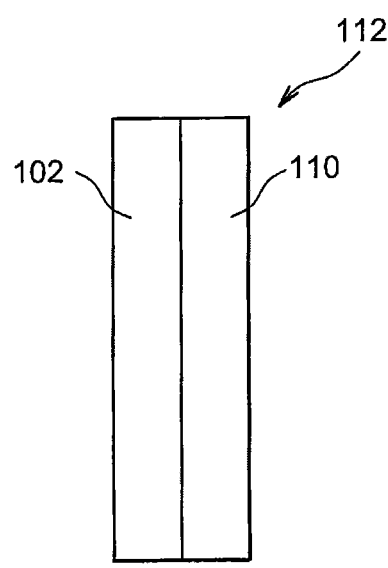
Figure 7A:
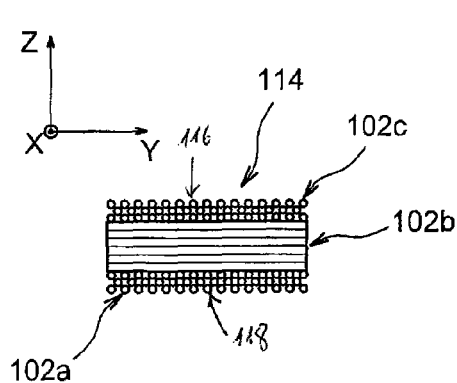
Figure 7B:
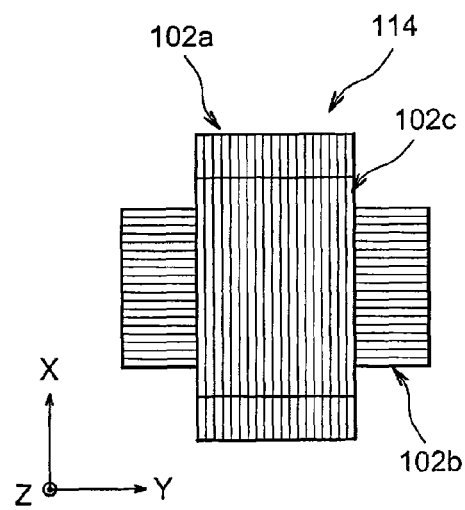
Figure 8:
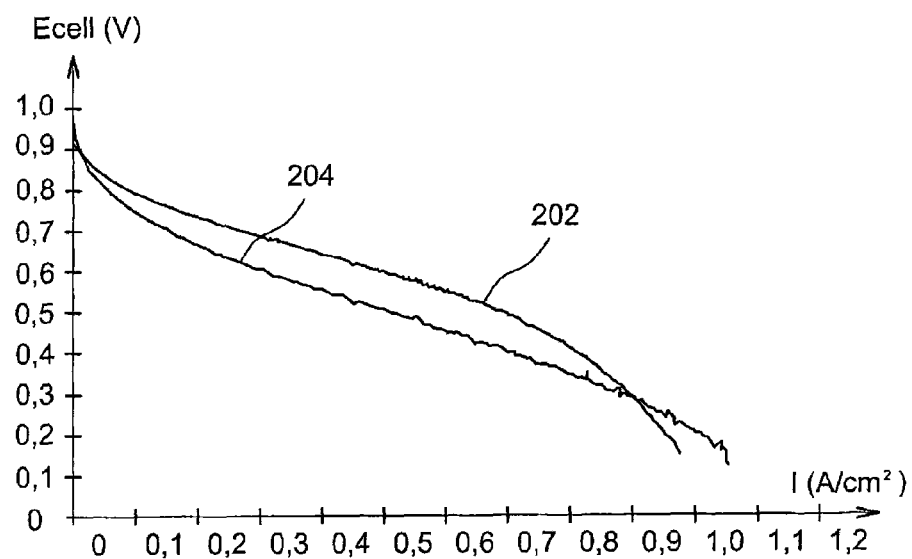
Figure 9A:
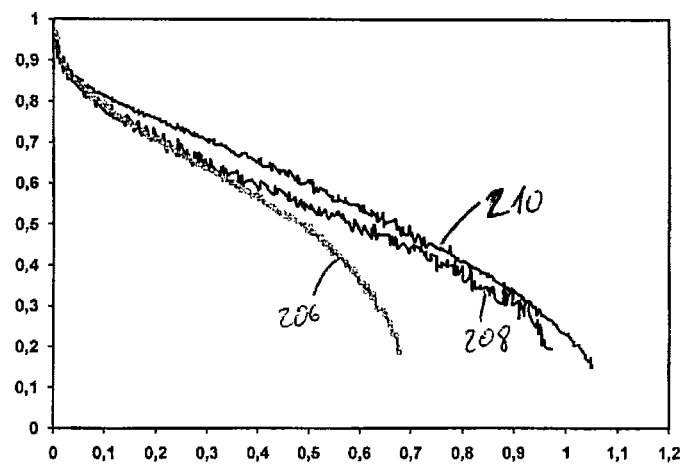
Figure 9B:
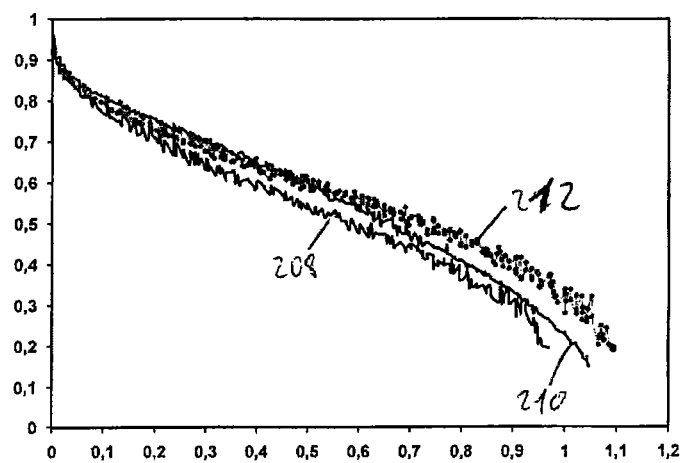

The present invention will be better understood on reading the description of example embodiments given purely as an indication and in no way restrictively, making reference to the appended illustrations in which:

FIG. 1 represents diagrammatically an electrochemical cell of an electrochemical device such as a PEM-type fuel cell or electrolyser, FIG. 2 represents diagrammatically an electrochemical device such as a PEM-type fuel cell or electrolyser, FIGS. 3A and 3B represent top and section views of a portion of a unidirectional web of carbon filaments of a diffusion layer according to a particular embodiment, FIG. 4 represents a section view of a wire including carbon filaments used in a diffusion layer according to a particular embodiment, FIG. 5 represents a top view of a unidirectional web of carbon filaments used in manufacturing a diffusion layer according to a particular embodiment, FIG. 6 represents a diffusion layer according to a particular embodiment, FIGS. 7A and 7B represent a multiaxial web of carbon filaments forming a diffusion layer according to a particular embodiment, FIG. 8 represents the polarisation curves of an electrochemical cell including diffusion layers produced from webs of carbon filaments, and of an electrochemical cell of the prior art including diffusion layers made from carbon felt, FIGS. 9A and 9B represent the polarisation curves of electrochemical cells including diffusion layers made from needle-punched unidirectional webs of carbon filaments.

Identical, similar or equivalent portions of the various figures described below have the same numerical references, to make it easier to move from one figure to another.

The various parts represented in the figures are not necessarily represented at a uniform scale, in order to make the figures more readable.

The various possibilities (variants and embodiments) must be understood as not being mutually exclusive, and being able to be combined with one another.

DETAILED ACCOUNT OF PARTICULAR EMBODIMENTS

Reference is made firstly to FIGS. 3A and 3B, in which a portion of a unidirectional web 102 of carbon filaments 104 forming part of a diffusion layer according to a particular embodiment is represented.

Web 102 is formed by multiple continuous carbon filaments 104 positioned roughly next one another, and all aligned in one direction parallel with axis x. In FIGS. 3A and 3B only a portion of unidirectional web 102 is represented. Unidirectional web 102 is of a thickness (dimension along axis z, which is the smallest dimension of the web compared to the other dimensions, namely the length and width of the web) of between approximately 10 µm and 200 µm, where this thickness depends on the diameter of carbon filaments 104 and the maximum number of carbon filaments 104 which are superimposed on to one another in unidirectional web 102. Such a web 102 therefore includes a number of carbon filaments 104 which depends on the desired grammage and the width of web 102. The thickness of unidirectional web 102 may be chosen to be as small as possible in order that the electrical resistance of web 102 is as low as possible, and in order that the diffusion layer which is produced from unidirectional web 102 is as thin as possible. The surface mass of unidirectional web 102 is, for example, between 40 g/m$^2$ and 60 g/m$^2$.

Carbon filaments 104 of unidirectional web 102 are, for example, made of polyacrilonitrile (PAN). Carbon filaments 104 can initially be grouped together in the form of wires. Such a wire 105 is represented with a section view in FIG. 4. Wire 105 consists of multiple carbon filaments 104 extending in a direction parallel with the length of the wire (in axis x in the example of FIG. 4) and embedded in a sheath 106 made of resin. Each wire 105 may include between approximately 1,000 and 320,000 carbon filaments 104. To produce web 102, wires 105 which have the largest possible number of carbon filaments 106 may be chosen, due to their lower cost. Wires 105 including between approximately 3,000 and 24,000 carbon filaments 104 will preferably be chosen.

Carbon filaments 104 used to form unidirectional web 102 have, for example, a diameter of between 6 µm and 8 µm and an electrical resistivity of between 0.8 Ω.cm and 1.8 Ω.cm.

In the course of production of web 102 carbon filaments 104 are attached to one another, for example by wires 108 made from a thermofusible material positioned transversely to the direction of carbon filaments 104, on carbon filaments 104 (FIG. 5). It is also possible for carbon filaments 104 to be attached through a frame, for example a frame made of an electrically conducting material such as metal, which may also form a contour of the diffusion layer.

As represented in FIG. 6, a proportion of unidirectional web 102 is cut and used as a diffusion support, which can then be attached to a microporous layer 110 to form a diffusion layer 112. It is, however, possible not to use a microporous layer 110; in this case diffusion layer 112 is formed only by carbon filaments 104. Diffusion layers similar to diffusion layer 112 are used to produce elementary electrochemical cells, of structure comparable to electrochemical cell 10 previously described in connection with FIG. 1, where these cells are then assembled to form an electrochemical device such as a PEM fuel cell or a PEM electrolyser, with a structure comparable to electrochemical device 50 previously described in connection with FIG. 2.

The diffusion layer is formed from several superimposed unidirectional webs of carbon filaments forming a multiaxial web of carbon filaments. Such a multiaxial web 114 is represented in FIGS. 7A and 7B.

Multiaxial web 114 represented in FIGS. 7A and 7B is formed by the superimposition and assembly of three unidirectional webs 102a, 102b and 102c, for example similar to previously described unidirectional web 102. A first web 102a is positioned such that the carbon filaments of this web 102a are aligned in a first direction (parallel with axis x in the example of FIGS. 7A and 7B). A second unidirectional web 102b is superimposed on first web 102a such that the carbon filaments of this second web 102b are aligned in a second direction, advantageously perpendicular to the first direction (parallel with axis y in the example of FIGS. 7A and 7B). Finally, a third unidirectional web 102c is superimposed on second web 102b such that the carbon filaments of this third web 102c are aligned in a third direction perpendicular to the second direction and parallel with the first direction.

The diffusion layer is then completed by cutting the desired area of multiaxial web 114 to form the diffusion layer. The cut area of each unidirectional web 102a, 102b and 102c forming multiaxial web 114 is roughly equal to the area of the diffusion layer, in order that the entire area of the diffusion layer is formed by superimposition of the different unidirectional webs. Optionally, the cut portion of multiaxial web 114 can be attached to a microporous layer, for example made of carbon and/or one or more other materials, for example hydrophobic materials.

The previously described multiaxial web is only one possible example embodiment. The diffusion layer can, generally, include one or more superimposed unidirectional webs of carbon filaments. The multiaxial web can preferably include between one and five unidirectional webs, and preferentially between one and four, or between two and five unidirectional webs. The total thickness of the diffusion layer obtained in this manner is preferentially of between approximately 10 μm and 800 μm. Finally, the alignments of the webs used can be different to the previously described example.

The steps implemented to produce the previously described diffusion layer are now described.

Each of the unidirectional web or webs 102 is produced independently by spreading, side-by-side, in a roughly uniform manner, carbon filaments 104.

The carbon filaments of the web or of each of the webs are then attached to one another, for example by wires made of a thermofusible material, positioned transversely to the carbon filaments of the web, as described previously in connection with FIG. 5. It is also possible, as a variant, to use a frame, for example made of metal, to attach the carbon filaments.

When the diffusion support is intended to be formed by a multiaxial web of carbon filaments, the unidirectional webs are then superimposed on one another, for example as in the example of FIGS. 7A and 7B, and the alignment of the carbon filaments can differ from one unidirectional web to the next.

When the unidirectional webs are superimposed on one another, they can be subject to an operation known as a needle-punch operation, consisting in breaking a proportion of the filaments in a direction perpendicular to all the alignments of the carbon filaments of the different unidirectional webs, i.e. in a direction parallel with the thickness of the multiaxial web produced (parallel with axis z in the examples of FIGS. 5 and 7A, 7B), by using for example needles, which are themselves attached to a tray, which traverse the multiaxial web at regular intervals, the web being moved relative to the needles, creating impacts through the unidirectional webs of carbon filaments. This needle-punch operation enables the webs superimposed on one another to be held in place mechanically, in order that they can be handled without modifying the structure formed by the superimposition, or fabric-laying, of the different unidirectional webs. To do so, the needles are, for example, sunk in the web of carbon filaments to a depth of between 10 mm and 16 mm, or all the way through the multiaxial web, with a density of blows, or impacts, of between 100 blows/cm$^2$ and 140 blows/cm$^2$, or between 100 and 300 impacts/cm$^2$. The needle loom, or machine, is, for example, of the ASSELIN type, and the needles are, for example, SINGER needles of the 15×18×32 3.5 BL RB 30 A06/15 type installed on a block which is approximately 15 mm or 20 mm less high than the webs of carbon filaments. The needles used can have lateral dimensions (dimensions perpendicular to the thickness of the unidirectional webs) of between approximately 0.5 mm and 3 mm. In addition, the needles can be high enough to go all the way through the unidirectional webs.

As a variant, the needle-punch operation can be accomplished hydraulically, where the needles are in this case replaced, for example, by air or water jets.

Carbon filaments, notably those obtained from PAN-based precursors, are fragile. In order to improve their mechanical properties, and by this means to handle them more easily without risk of breakage during the manufacture of the unidirectional webs, the carbon filaments can thus be subjected to a treatment called sizing. This sizing, which is accomplished in the carbon filaments before the unidirectional webs are formed, consists in coating the carbon filaments with a resin, for example an epoxy-based resin. This resin can then be eliminated by a thermal treatment (de-sizing). This thermal treatment includes, for example, implementation of the following steps (the carbon filaments are initially at ambient temperature):

temperature is increased, for approximately 16 minutes, until approximately 100° C. is reached, temperature is maintained at approximately 100° for approximately 20 minutes, temperature is increased, for approximately 30 minutes, until approximately 268° C. is reached, temperature is maintained at approximately 268° C. for approximately 30 minutes, temperature is increased, for approximately 12 minutes, until approximately 340° C. is reached, temperature is maintained at approximately 340° C. for approximately 40 minutes, temperature is increased, for approximately 40 minutes, until approximately 425° C. is reached, temperature is maintained at approximately 425° C. for approximately 20 minutes, return to ambient temperature.

After such a thermal de-sizing treatment the resin has been transformed into a completely carbon-based material.

This step of de-sizing can also enable the diffusion layer to be given a hydrophilic character, and consequently a diffusion layer to be obtained which is able to operate in an environment with low relative humidity, for example of between approximately 0% and 50%.

When carbon filaments wires are initially used to produce the unidirectional webs, the material of the wires sheaths can also be eliminated during this de-sizing step.

This de-sizing may also be accomplished by other types of treatment, for example a chemical treatment, or a UV treatment.

Other treatments of the diffusion support, enabling the surface energy of the carbon filaments to be modified, can also be implemented in order to give these filaments a hydrophobic or hydrophilic character, depending on the envisaged application.

After these treatments, the diffusion layer can, if required, be joined to a microporous layer before being joined to the other elements to produce the electrochemical device.

The carbon fibre webs can, for example, be produced using the method described in document WO 98/44183, which describes the production of carbon fibre webs used to produce composite materials.

Several example embodiments of multiaxial webs of carbon filaments used to form diffusion layers of PEM fuel cells are described below.

EXAMPLE 1

The carbon filaments used are made of PAN with a high resistance, and produced from 12K-type wires (12,000 filaments per wire). The carbon filaments used are, for example, chosen such that they have the following physical properties:

Traction resistance: 4,900 MPa;

Traction module: 230 GPa;

Elongation: 2.1%;

Mass/unit of length: 800 Tex (g/km);

Density: 1.8 g/cm$^3$.

These carbon filaments are treated by sizing accomplished with an epoxy resin.

The unidirectional webs are then produced from these carbon filaments. The unidirectional webs obtained in this case have a surface mass of approximately 50 g/m$^2$.

The carbon filaments of each web are then attached by wires made of a thermofusible material positioned transversely to the carbon filaments of the web, similar to wires 108 represented in FIG. 5.

Three unidirectional webs obtained as described above are then stacked together. These three unidirectional webs are aligned relative to one another as in the example previously described in connection with FIGS. 7A and 7B. The second web is therefore aligned perpendicularly to the first web, and the third web is aligned parallel with the first web. A multiaxial web is obtained having carbon filaments which are aligned, taking as the reference the alignment of the carbon filaments of the first web, according to the following configuration: 0°/90°/0°.

The values of the angles formed between the carbon filaments of the different webs can also be different to those indicated above.

A needle-punch operation is then implemented with a tray containing approximately 4,000 needles per meter of width, where each needle is approximately 20 mm in length and has a triangular-shaped end and is approximately 0.15 mm long. During the needle-punch operation the tray is adjusted so as to have a depth of penetration of the needles into the multiaxial web of approximately 12 mm, with a rate of approximately 138 blows/cm². The needle loom is, for example, of the ASSELIN type, and the needles are, for example, SINGER needles of the 15×18×32 3.5 BL RB 30 A06/15 type installed on a block which is positioned approximately 15 mm or 20 mm lower than the webs of carbon filaments.

The sizing and the thermofusible wires of the multiaxial web are then eliminated by a thermal treatment, for example similar to the one previously described.

EXAMPLE 2

Unidirectional webs are firstly produced in a manner comparable to the first previously described example, using similar carbon filaments.

Four unidirectional webs are then stacked together. The second web is positioned on the first web such that the alignment of its carbon filaments forms an angle of approximately 45° relative to the alignment of the carbon filaments of the first web. The third web is positioned on the second web such that the alignment of its carbon filaments forms an angle of approximately 45° relative to the alignment of the carbon filaments of the second web and approximately 90° relative to the alignment of the carbon filaments of the first web. Finally, the fourth web is positioned on the third web such that the alignment of its carbon filaments forms an angle of approximately 45° relative to the alignment of the carbon filaments of the third web and approximately 135° relative to the alignment of the carbon filaments of the first web. This stack forms a multiaxial web having carbon filaments which are aligned, using the alignment of the carbon filaments of the first web as the reference, with a configuration 0°/45°/90°/135°.

Needle punching and de-sizing are then accomplished in a comparable manner to the first example embodiment described above.

EXAMPLE 3

Unidirectional webs are firstly produced in a manner comparable to the first previously described example, using similar carbon filaments.

Four unidirectional webs are then stacked together. The second web is positioned on the first web such that the alignment of its carbon filaments forms an angle of approximately 90° relative to the alignment of the carbon filaments of the first web. The third web is positioned on the second web such that the alignment of its carbon filaments forms an angle of approximately 90° relative to the alignment of the carbon filaments of the first web (where the carbon filaments of the second web are parallel with the carbon filaments of the third web). Finally, the fourth web is positioned on the third web such that the alignment of its carbon filaments forms an angle of roughly zero relative to the alignment of the carbon filaments of the first web. This stack forms a multiaxial web having carbon filaments which are aligned, using the alignment of the carbon filaments of the first web as the reference, with a configuration 0°/90°/90°/0°.

Needle punching and de-sizing are then accomplished in a comparable manner to the first example embodiment described above.

In a variant of the examples described above, it is possible not to attach the carbon filaments by wires made of a thermofusible material, but by epoxy resin deposited transversely to the direction of the carbon filaments. In this case the sizing is eliminated prior to this attachment. The unidirectional webs of carbon filaments are then superimposed according to the desired configuration.

In another variant, the carbon filaments can be attached by a frame made from an electrically conducting material such as a metal, or through clamps which hold the ends of the carbon filaments. It is, for example, possible to use a holding system in the production line enabling quite a large area to be obtained. In this case, the carbon filaments can be stretched and held by a metal piece which clamps the filaments transversely to the direction of the filaments.

An example embodiment of an electrochemical cell which is, for example, intended to be used in a PEM fuel cell, is now described.

A first diffusion layer is firstly produced by cutting a portion of the multiaxial web of carbon filaments according to previously described example n°2, of roughly square shape, and of area equal to approximately 25 cm².

This first diffusion layer is positioned on the cathode side of the cell. This diffusion layer is positioned, in the cell, such that the portion from the first web of carbon filaments is adjacent to the channels of the cathodic monopolar plate, and such that direction 0° (alignment of the carbon filaments of the portion from the first web of carbon filaments) is perpendicular to the length of the channels, where this length represents the main direction of the channels.

A second diffusion layer is then produced by cutting a portion of the multiaxial web of carbon filaments according to previously described example n°3, of roughly square shape, and of area equal to approximately 25 cm².

This second diffusion layer is positioned on the anode side of the cell. This diffusion layer is positioned, in the cell, such that the portion from the first or fourth web of carbon filaments is adjacent to the channels of the anodic monopolar plate, and such that direction 0° (alignment of the carbon filaments of the portion from the first or fourth web of carbon filaments) is perpendicular to the length of the channels.

The diffusion layers have an electrically conducting surface relative to the monopolar plates of the electrochemical cell.

The characteristics of such an electrochemical cell are obtained with low relative humidity (approximately 30%), and with a hydrogen/air co-current at a temperature of approximately 80° C., at a pressure of approximately 1.5 bar, and the stoichiometrics of which are: $S_{H2}$=15 and $S_{O2}$=7, where the cell is clamped at a pressure equal to approximately 1 MPa. These characteristics are tested by measuring a curve of polarisation of the cell corresponding to the value of the voltage obtained at the cell's terminals as a function of the current traversing it.

Polarisation curve 202 of this electrochemical cell is represented in FIG. 8, and is compared to a measured polarisation curve 204 for an electrochemical cell of comparable structure, except for the diffusion layers, which are produced from carbon felts. It can be seen in FIG. 8 that the voltage obtained with a cell including diffusion layers produced from webs of carbon filaments is higher than that obtained with a cell including diffusion layers produced from carbon felts, for a current ranging from approximately 0 to approximately 0.85 A/cm². A PEM fuel cell including a stack of electrochemical cells with diffusion layers produced from unidirectional webs of carbon filaments, or more generally any electrochemical device including at least one such diffusion layer, thus enables a higher voltage to be produced at its terminals for an equivalent current than when the diffusion layers are produced from carbon felts.

In addition to the function of holding the unidirectional webs together, the needle-punch operation enables the characteristics of an electrochemical cell including a diffusion layer formed by unidirectional webs of carbon filaments having been subject to such a needle-punch operation to be improved compared to an electrochemical cell including a diffusion layer formed by these same unidirectional webs of carbon filaments but not having been subjected to a needle-punch operation. This improvement of characteristics takes the form, for example, of an increase of the electrical conductivity of the electrochemical cell and/or of a reduction of the electrical contact resistances compared to the other components of the electrochemical cell (gas distributor, active layer, microporous deposit).

In order to improve these characteristics still further, the needle-punch operation may go all the way through the unidirectional webs of carbon filaments. The needle-punch operation may also go through two opposite main faces (referenced 116 and 118 in FIG. 7A) of the unidirectional webs, either during a single needle-punch operation (where the unidirectional webs are in this case positioned between two trays of needles) or by needle punching both opposite main faces consecutively. The needle punching may also be undertaken with a density of impacts of the needles against the unidirectional webs of between approximately 100 and 300 impacts/cm². This impact density can be controlled by choosing a suitable density of needles and/or by controlling the frequency at which the needles traverse the unidirectional webs. Such needle punching also enables the gas transfers within the electrochemical cell to be improved.

The needle-punch operation can be undertaken all the way through the unidirectional webs forming the diffusion layer. As a variant, the needle punching can be accomplished through stacks of unidirectional webs including a number of unidirectional webs which is less than the number of all the unidirectional webs forming the diffusion layer, where the needle punching is then repeated for the stack including all the unidirectional webs forming the diffusion layer.

FIGS. 9A and 9B illustrate this improvement of the characteristics of the electrochemical cells by means of the accomplished needle-punch operations. Curve 206 represented in FIG. 9A is the polarisation curve (abscissa: voltage at the terminals of the electrochemical cell, volts; ordinate: density of current traversing the electrochemical cell, A/cm²) of an electrochemical cell including four aligned unidirectional webs, taking the alignment of the carbon filaments of the first web as the reference, with a 0°/90°/90°/0° configuration, the webs not being needle-punched, or being needle-punched in a different manner to the one described above, enabling the characteristics of the electrochemical cell to be improved, i.e. by not penetrating through the entire thickness of the unidirectional webs, and with a surface impact density of less than 100 impacts/cm². Each of the webs used has a grammage of approximately 50 g/m² and is formed of wires having 12,000 carbon filaments. Curves 208 and 210 are the minimum and maximum polarisation curves obtained for a given electrochemical cell, but in which the unidirectional webs of carbon filaments are needle-punched, penetrating all the way through the unidirectional webs, with a surface impact density of between approximately 100 and 300 impacts/cm², in this case equal to approximately 138 impacts/cm². The characteristics of the electrochemical cell can be improved still further by undertaking the needle punching from both sides of the unidirectional webs (curve 212 represented in FIG. 9B).

Although the diffusion layers produced from at least one unidirectional web of carbon filaments have already been described above, principally for a PEM-type fuel cell or an electrolyser, these diffusion layers apply to every electrochemical device using at least one diffusion layer made from an electrically conducting material, such as a phosphoric acid fuel cell or a battery.

The invention claimed is:

1. A method for producing a diffusion layer of an electrochemical device, comprising:
    superimposing a plurality of unidirectional webs of carbon filaments, each of the webs comprising a plurality of continuous carbon filaments positioned next to one another and aligned in a first direction and parallel to one another,
        wherein the plurality of superimposed unidirectional webs extend from a first end of the continuous carbon filaments to a second end of the continuous carbon filaments in a nonwoven arrangement, at least a first portion of the filaments in the plurality of superimposed unidirectional webs at the first end being mechanically joined to hold together the plurality of superimposed unidirectional webs at the first end and maintain their parallel alignment, and at least a second portion of the filaments in the plurality of superimposed unidirectional webs at the second end being mechanically joined to hold together the plurality of superimposed unidirectional webs at the second end and maintain their parallel alignment;
    needle punching of the superimposed unidirectional webs, breaking a proportion of the continuous carbon filaments such that broken portions of the carbon filaments are tangled with other carbon filaments of the plurality of superimposed unidirectional webs at the first end and the second end, respectively; and
    cutting of at least a proportion of the plurality of superimposed unidirectional webs, wherein the continuous carbon filaments form at least one electrically conducting outer surface of the diffusion layer,
        wherein the needle punching is accomplished all the way through the plurality of superimposed unidirectional webs, and/or through two principal opposite faces of the plurality of superimposed unidirectional webs, and/or with an impact density against the plurality of superimposed unidirectional webs of between approximately 100 and 300 impacts/cm².

2. The method according to claim 1, in which an alignment of the carbon filaments of at least a first of the unidirectional webs forms a non-zero angle relative to an alignment of the carbon filaments of at least a second of the unidirectional webs.

3. The method according to claim 1, in which, prior to the superimposition of the unidirectional webs, the carbon filaments are coated with a material capable of strengthening mechanical properties of the carbon filaments, and are then attached to one another, forming the different unidirectional webs, wherein the strengthening material is eliminated after the carbon filaments are attached to one another.

4. The method according to claim 1, further comprising treating the carbon filaments giving the carbon filaments a hydrophobic or hydrophilic character.

5. The method according to claim 1, in which each of the unidirectional webs is between approximately 10 μm and 200 μm thick and/or has a surface mass of between approximately 40 g/m$^2$ and 60 g/m$^2$.

6. The method according to claim 1, in which each carbon filament has a diameter of between approximately 6 μm and 8 μm and/or has an electrical resistivity of between approximately 0.8 Ω.cm and 1.8 Ω.cm.

7. The method according to claim 1, in which an alignment of the carbon filaments of at least a first of the unidirectional webs forms a non-zero angle or an angle of between approximately 10° and 95°, or between approximately 40° and 50°, relative to an alignment of the carbon filaments of at least a second of the unidirectional webs of carbon filaments.

8. The method according to claim 1, in which the diffusion layer includes a number of superimposed unidirectional webs of carbon filaments greater than or equal to two and less than or equal to five.

9. The method according to claim 1, in which the diffusion layer includes first and second unidirectional webs of carbon filaments such that the alignment of the carbon filaments of the first unidirectional web forms an angle of between approximately 0° and 20° relative to the alignment of the carbon filaments of the second unidirectional web, and also includes a third unidirectional web of carbon filaments positioned between the first and second unidirectional webs of carbon filaments, such that each of the alignments of the carbon filaments of the first and second unidirectional webs forms an angle of between approximately 70° and 110° relative to the alignment of the carbon filaments of the third unidirectional web.

10. The method according to claim 9, in which the diffusion layer further includes a fourth unidirectional web of carbon filaments positioned between the first and second unidirectional web of carbon filaments, such that the alignment of the carbon filaments of the fourth unidirectional web forms an angle of between 70° and 110° relative to each of the alignments of the carbon filaments of the first and second unidirectional webs.

11. The method according to claim 1, in which the diffusion layer includes four unidirectional webs of carbon filaments, wherein these webs are superimposed such that the alignments of the carbon filaments of each of the four unidirectional webs form an angle of between approximately 25° and 65° relative to the alignment or alignments of the carbon filaments of the unidirectional webs adjacent to the unidirectional web.

12. A method for producing an electrochemical cell with a proton exchange membrane, including at least implementation of a method of production of a diffusion layer according to claim 1.

13. The method according to claim 12, in which the alignment of the carbon filaments of at least one of the unidirectional webs of the diffusion layer is roughly perpendicular to a direction of a length of at least one channel of a monopolar plate positioned opposite the diffusion layer.

14. A method for producing a fuel cell with a proton exchange membrane, including at least implementation of a method of production of an electrochemical cell according to claim 12.

15. A method for producing an electrolyser with a proton exchange membrane, including at least implementation of a method of production of an electrochemical cell according to claim 2.

16. The method according to claim 1, wherein the needle punching is accomplished all the way through the plurality of superimposed unidirectional webs, through two principal opposite faces of the plurality of superimposed unidirectional webs, and with an impact density against the plurality of superimposed unidirectional webs of between approximately 100 and 300 impacts/cm$^2$.

* * * * *